US009667100B2

(12) United States Patent
Itaya

(10) Patent No.: US 9,667,100 B2
(45) Date of Patent: May 30, 2017

(54) VOLTAGE MONITORING CONTROL DEVICE AND VOLTAGE MONITORING CONTROL METHOD

(71) Applicant: MITSUBISHI ELECTRIC CORPORATION, Chiyoda-ku, Tokyo (JP)

(72) Inventor: Nobuhiko Itaya, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 0 days.

(21) Appl. No.: 14/900,887

(22) PCT Filed: Jun. 26, 2013

(86) PCT No.: PCT/JP2013/067557
§ 371 (c)(1),
(2) Date: Dec. 22, 2015

(87) PCT Pub. No.: WO2014/207848
PCT Pub. Date: Dec. 31, 2014

(65) Prior Publication Data
US 2016/0156226 A1  Jun. 2, 2016

(51) Int. Cl.
*H02J 3/14* (2006.01)
*H02J 13/00* (2006.01)
(Continued)

(52) U.S. Cl.
CPC ............ *H02J 13/0017* (2013.01); *H02J 3/14* (2013.01); *G05F 1/12* (2013.01); *G05F 1/16* (2013.01);
(Continued)

(58) Field of Classification Search
CPC ...... G05F 1/12; G05F 1/16; G05F 1/70; H02J 3/12; H02J 3/14; H02J 3/16; H02J 3/18; H02J 13/0017
See application file for complete search history.

(56) References Cited

U.S. PATENT DOCUMENTS

2009/0284232 A1* 11/2009 Zhang ....................... G05F 1/67
322/89
2012/0323390 A1* 12/2012 Kobayasi .................. H02J 3/14
700/295
(Continued)

FOREIGN PATENT DOCUMENTS

JP          60-241725 A     11/1985
JP          09-154235 A     6/1997
(Continued)

OTHER PUBLICATIONS

International Search Report (PCT/ISA/210) issued on Jul. 23, 2013, by the Japanese Patent Office as the International Searching Authority for International Application No. PCT/JP2013/067557.
(Continued)

*Primary Examiner* — Fred E Finch, III
*Assistant Examiner* — Rafael O De Leon Domenech
(74) *Attorney, Agent, or Firm* — Buchanan Ingersoll & Rooney PC

(57) ABSTRACT

A centralized voltage control device connected to a first local voltage control device adjusting the control amount every second cycle such that a voltage of a transformer-type voltage control apparatus is maintained within a range between voltage upper and lower limit values updated every first cycle and a second local voltage control device adjusting the control amount of a reactive-power-modified voltage control apparatus every third cycle, wherein the centralized voltage control device includes a load and power-generation-amount estimation unit estimating a load and power-
(Continued)

generation-amount distribution every first cycle under condition of a mean load and mean power generation, condition of a minimum load and maximum power generation, and condition of a maximum load and minimum power generation, a voltage-fluctuation-band estimation unit estimating a voltage fluctuation band, an optimal-voltage-distribution determination unit determining a control target value of the first local voltage control device, and a voltage upper-and-lower-limit-value determination unit.

9 Claims, 9 Drawing Sheets

(51) Int. Cl.
    *G05F 1/12*     (2006.01)
    *H02J 3/12*     (2006.01)
    *G05F 1/16*     (2006.01)
    *H02J 3/18*     (2006.01)
    *G05F 1/70*     (2006.01)
    *H02J 3/16*     (2006.01)

(52) U.S. Cl.
    CPC   *G05F 1/70* (2013.01); *H02J 3/12* (2013.01); *H02J 3/16* (2013.01); *H02J 3/18* (2013.01); *Y02B 70/3225* (2013.01); *Y02E 40/76* (2013.01); *Y04S 10/545* (2013.01); *Y04S 20/222* (2013.01)

(56) References Cited

U.S. PATENT DOCUMENTS

| | | |
|---|---|---|
| 2014/0288725 A1 | 9/2014 | Itaya |
| 2015/0326018 A1* | 11/2015 | Hidaka .................. G01R 21/00 307/24 |
| 2016/0041574 A1* | 2/2016 | Maitani .................. G06Q 50/16 700/291 |
| 2016/0261115 A1* | 9/2016 | Asati ........................ H02J 3/14 |

FOREIGN PATENT DOCUMENTS

| | | |
|---|---|---|
| JP | 09-322404 A | 12/1997 |
| JP | 11-289663 A | 10/1999 |
| JP | 11-289664 A | 10/1999 |
| JP | 2002-165367 A | 6/2002 |
| JP | 2004-056931 A | 2/2004 |
| JP | 2005-269744 A | 9/2005 |
| JP | 2009-065788 A | 3/2009 |
| WO | WO 2013/065114 A1 | 5/2013 |

OTHER PUBLICATIONS

Written Opinion (PCT/ISA/237) issued on Jul. 23, 2013, by the Japanese Patent Office as the International Searching Authority for International Application No. PCT/JP2013/067557.

* cited by examiner

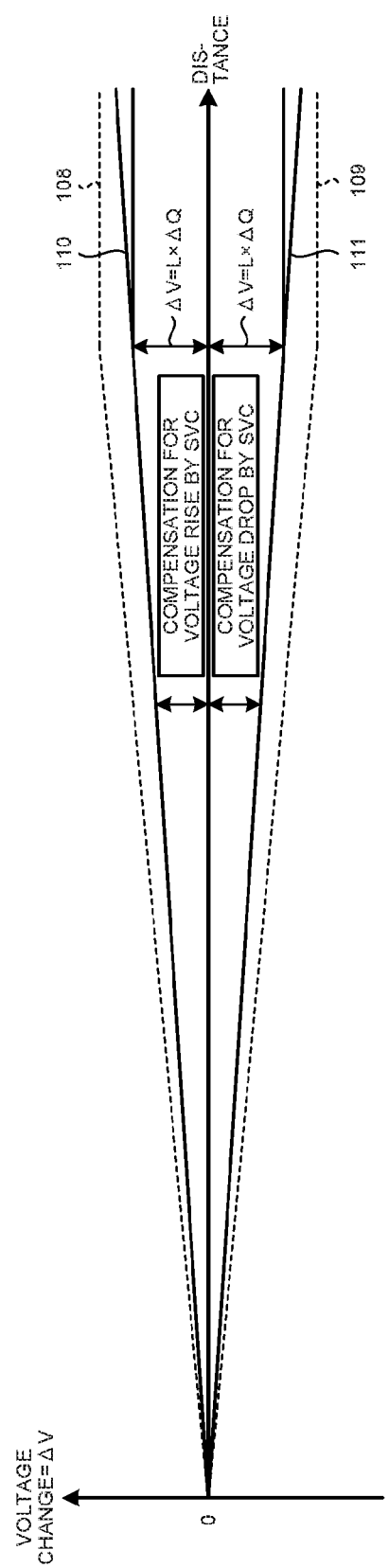

VOLTAGE MONITORING CONTROL DEVICE AND VOLTAGE MONITORING CONTROL METHOD

FIELD

The present invention relates to a voltage monitoring control device and a voltage monitoring control method.

BACKGROUND

A power distribution system is generally made up of a high-voltage system (normally, 6600 V) and a low-voltage system (for example, 100 V to 200 V). Power-receiving terminals used by general consumers are connected to the low-voltage system. Electric utilities are obligated to maintain the voltage at the power-receiving terminals used by general consumers within an appropriate range (for example, maintain the voltage between 95 V and 107 V in the case of a receiving power of 100 V). Therefore, power utilities adjust the amount of control (for example, operate the tap) of a voltage control apparatus (such as an LRT (Load Ratio Control Transformer: on-load tap-changer transformer) or an SVR (Step Voltage Regulator)) connected to the high-voltage system in order to maintain the voltage at the power-receiving terminals used by general consumers. In the following descriptions, the power distribution system indicates a high-voltage system thereof unless otherwise specified.

Conventionally, a local voltage control device is commonly used for voltage control in power distribution systems. The local voltage control device is integrated with or provided along with a transformer-type voltage control apparatus such as an LRT or an SVR, and it controls the voltage of the voltage control apparatus in an autonomous distributed manner on the basis of measurement information (voltage and power flow) near the location point of the voltage control apparatus. However, in recent years, for example, due to diversification in the use of electricity and the widespread use of distributed power supplies due to photovoltaic power generation and the like, the load distribution in the power distribution system tends to fluctuate greatly and non-uniformly over time. This makes it difficult to maintain an appropriate voltage for conventional voltage control in the power distribution system.

Therefore, instead of the voltage control system of the autonomous distribution type, a method has been proposed to provide centralized control of the voltage of the power distribution system in a consistent manner over the entire system (a centralized control method). Specifically, a mechanism has been proposed in which measurement information (voltage and power flow) at multiple points within the power distribution system is collected in a centralized voltage control device by using a dedicated network, this centralized voltage control device determines the amount of control of each voltage control apparatus on the basis of the measurement information, and then the centralized voltage control device automatically and remotely indicates the amount of control to each voltage control apparatus (see, for example, Patent Literature 1).

CITATION LIST

Patent Literature

Patent Literature 1: Japanese Patent Application Laid-open No. H9-322404

SUMMARY

Technical Problem

However, the connection of distributed power supplies to the low-voltage system due to photovoltaic power generation has recently been increasing every year. Therefore, for example, when the amount of photovoltaic power generation greatly changes because of abrupt changes in the amount of solar radiation caused by cloud flow during clear skies, a voltage change in the power distribution system due to this significant change in the amount of photovoltaic power generation may reach a level that cannot be ignored. The centralized voltage control device collects measurement information on the voltage and the power flow at each point of the power distribution system, and it assigns an optimal control to each voltage control apparatus. The optimal control is determined on the basis of the measurement information on the voltage and the power flow at the time. Therefore, when many photovoltaic power-generation devices are connected to the low-voltage system, there is a concern about the following problems.

(1) When the measurement monitoring cycle is extended (to several tens of minutes, for example), then, in a case such as when the amount of photovoltaic power generation greatly changes due to abrupt changes in the amount of solar radiation caused by cloud flow, the centralized voltage control device cannot follow the sudden voltage fluctuations.

(2) In contrast, when the measurement monitoring cycle is reduced (to seconds, for example), the communication load for measurement monitoring increases. This requires a substantial capital investment in a communication network.

As described above, when the communication load is taken into consideration, there are constraints on the measurement-information obtaining cycle. It is difficult for the centralized voltage control device to directly control short-cycle fluctuations in voltage (for example, 60 sec or shorter). A transformer-type voltage control apparatus controls a voltage by changing the tap position. Therefore, there is a problem in that changing the tap position an excessive number of times reduces the lifespan of the tap device. Meanwhile, a reactive-power-controlled voltage control apparatus, such as an SVC (Static Var Compensator: static reactive-power compensator) or a PCS (Power Conditioning System: power conditioner) with a reactive-power modifying function, can suppress voltage fluctuations with a short cycle by using local control.

Therefore, a method is considered in which, on a power distribution line on which frequent and large voltage fluctuations are expected, a reactive-power-controlled voltage control apparatus is provided downstream (on the load side) of a transformer-type voltage control apparatus to absorb a voltage change with a short cycle while a transformer-type voltage control apparatus absorbs a moderate voltage change.

In the transformer-type voltage control apparatus, a method is considered in which the tap device does not operate unless the voltage continues to deviate from a target control range for a given time (for example, 90 sec) so that the tap device does not operate frequently. However, when this time constant is excessive, voltage deviation from an appropriate range (voltage violation) continues for an extended period of time or occurs frequently. Therefore, there is a problem in that a costly large-capacitance reactive-power-controlled voltage control apparatus is required in order to reliably reduce the number of times the taps of a transformer-type voltage control apparatus are changed under the conditions where large voltage fluctuations occur frequently.

The present invention has been achieved in view of the above, and an object of the present invention is to, without increasing the communication load, maintain a voltage within an appropriate range by following voltage fluctuations in a power distribution system and to reduce the number of times the taps of a transformer-type voltage control apparatus are changed while reducing the cost.

Solution to Problem

In order to solve the above problems and achieve the object, an aspect of the present invention is a voltage monitoring control device that is connected, via a communication network, to a first local voltage control device, which is connected to a transformer-type voltage control apparatus that is connected to a power distribution line in a high-voltage system and controls a voltage on the power distribution line and which adjusts an amount of control of the voltage control apparatus every second cycle, which is shorter than a first cycle, such that a voltage value controlled by the voltage control apparatus is maintained within a range between a voltage upper-limit value and a voltage lower-limit value that are updated every first cycle, and a second local voltage control device, which is connected to a reactive-power-modified voltage control apparatus that controls a voltage on the power distribution line and which adjusts an amount of control of the voltage control apparatus every third cycle, which is shorter than the first cycle, the voltage monitoring control device including: a load and power-generation-amount estimation unit that estimates, every first cycle, a load and power-generation-amount distribution representing a difference between a pure load and a power-generation amount at each point of a power distribution system under each of a condition of a mean load amount and a mean power-generation amount, a condition of a minimum load amount and a maximum power-generation amount, and a condition of a maximum load amount and a minimum power-generation amount; a voltage-fluctuation-band estimation unit that estimates a voltage fluctuation band of the voltage within the first cycle on a basis of the load and power-generation-amount distribution; a control-target-voltage determination unit that determines a first threshold value for an allowance for an upper limit of an appropriate voltage range and a second threshold value for an allowance for a lower limit of an appropriate voltage range on a basis of the voltage fluctuation band estimated by the voltage-fluctuation-band estimation unit, and that determines a control target value to be indicated to the first local voltage control device on a basis of a difference between the first threshold value and the allowance for the upper limit and on a basis of a difference between the second threshold value and the allowance for the lower limit; a voltage upper-and-lower-limit-value determination unit that determines the voltage upper-limit value and the voltage lower-limit value on a basis of the control target value; and a transceiver unit that transmits the voltage upper-limit value and the voltage lower-limit value to the first local voltage control device via the communication network.

Advantageous Effects of Invention

According to the present invention, an effect is obtained where it is possible to, without increasing the communication load, maintain a voltage within an appropriate range by following voltage fluctuations in a power distribution system and to reduce the number of times the taps of a transformer-type voltage control apparatus are changed while reducing the cost.

BRIEF DESCRIPTION OF DRAWINGS

FIG. 9 is a diagram illustrating an example in which an allowance for the voltage compensation capability of a reactive-power-modified voltage control apparatus is created.

DESCRIPTION OF EMBODIMENTS

Exemplary embodiments of a voltage monitoring control device and a voltage monitoring control method according to the present invention will be explained below in detail with reference to the drawings. The present invention is not limited to the embodiments.

Embodiment

Figure 1:
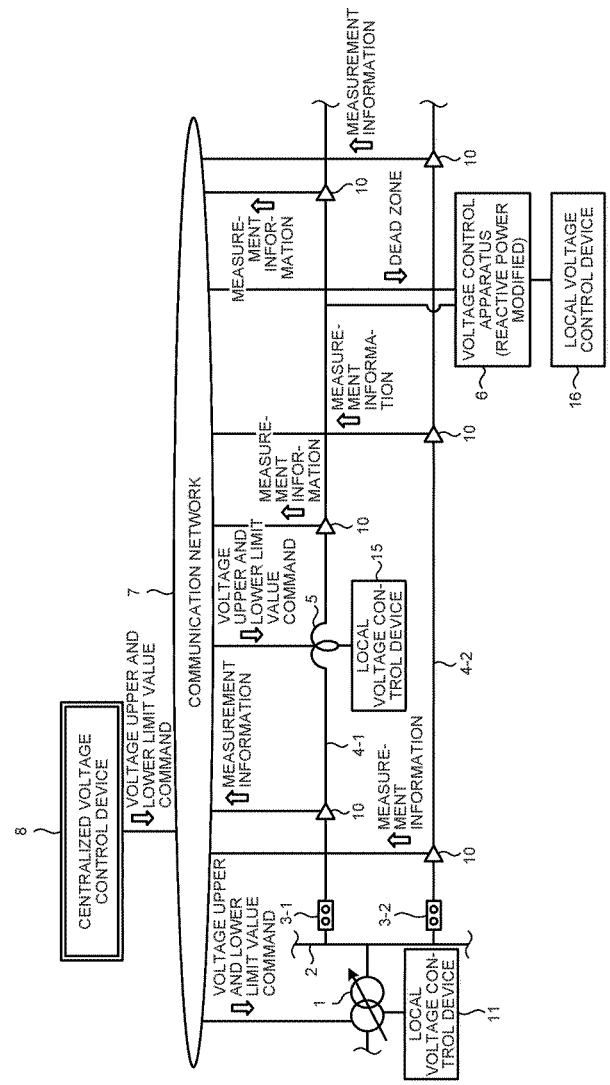
FIG. 1 is a diagram illustrating a configuration example of a voltage control system in a power distribution system according to an embodiment of the present invention.

FIG. 1 is a diagram illustrating a configuration example of a voltage control system in a power distribution system according to an embodiment of the present invention. In FIG. 1, a voltage control apparatus 1 is, for example, an LRT (Load Ratio Control Transformer: on-load tap changer transformer) that functions as a power-distribution transformer provided in a substation. A local voltage control device 11 is connected to the voltage control apparatus 1. The local voltage control device 11 controls the voltage control apparatus 1. The local voltage control device (voltage control device) 11 can, for example, be provided integrally with or provided along with the voltage control apparatus 1. The local voltage control device 11 controls the voltage control apparatus 1 by adjusting the amount of control of the voltage control apparatus 1, specifically, by adjusting the tap position. The local voltage control device 11 has a communication function and is connected to a communication network 7.

On the secondary side of the voltage control apparatus 1, a bus-bar 2 is connected. For example, two power distribution lines 4-1 and 4-2, which are in parallel, are connected to the bus-bar 2. The power distribution lines 4-1 and 4-2 are high-voltage system (with a voltage level of 6600 V) power distribution lines.

The power distribution line 4-1 is connected at its one end to the bus-bar 2 via a breaker 3-1. At multiple points on the power distribution line 4-1, voltage and power-flow measurement devices 10 are respectively provided, each of which measures the voltage and the power flow on the power distribution line 4-1. That is, the voltage and power-flow measurement devices 10 are connected to the power distribution line 4-1, measure the voltage and the power flow at the connection points, and output the measurement values as measurement information. Each of the voltage and power-flow measurement devices 10 measures the voltage and the power flow, for example, every given cycle (every second, for example) and transmits the mean value of the measurement results for a predetermined time (one minute, for example) as measurement information. The voltage and power-flow measurement devices 10 have a communication function and are connected to the communication network 7. The voltage and power-flow measurement devices 10, for example, regularly transmit measurement information to a centralized voltage control device 8 via the communication network 7. The centralized voltage control device 8 determines the target voltage distribution and the operating state of each voltage control apparatus with which the target voltage distribution is attained, in an objective region of the system, and gives a command value to each voltage control apparatus. The centralized voltage control device 8 can be provided in a service station, a control station, or the like, that manages the objective region of the system.

On the power distribution line 4-1, a voltage control apparatus 5, which is an SVR (Step Voltage Regulator) that compensates for a voltage drop, is also connected. To the voltage control apparatus 5, a local voltage control device 15, which controls the voltage control apparatus 5, is connected. The local voltage control device 15, for example, can be provided integrally with or provided along with the voltage control apparatus 5. The local voltage control device 15 controls the voltage control apparatus 5 by adjusting the amount of control of the voltage control apparatus 5, specifically, by adjusting the tap position. The local voltage control device 15 has a communication function and is connected to the communication network 7.

On the power distribution line 4-1, a voltage control apparatus 6, which is a static reactive-power compensator (SVC: Static Var Compensator), is also connected. To the voltage control apparatus 6, a local voltage control device 16, which controls the voltage control apparatus 6, is connected. The local voltage control device 16, for example, can be provided integrally with or provided along with the voltage control apparatus 6. The local voltage control device 16 controls the voltage control apparatus 6 by adjusting the amount of control of the voltage control apparatus 6, specifically, by adjusting the reactive-power output. The local voltage control device 16 has a communication function and is connected to the communication network 7.

The power distribution line 4-2 is connected at its one end to the bus-bar 2 via a breaker 3-2. At multiple points on the power distribution line 4-2, similarly to the power distribution line 4-1, the voltage and power-flow measurement devices 10 are respectively provided, each of which measures the voltage and the power flow on the power distribution line 4-2.

The power distribution lines 4-1 and 4-2 are high-voltage system power distribution lines. Although not illustrated, low-voltage power distribution lines that constitute the low-voltage system (with a voltage level of 100 V to 200 V, for example) are connected respectively to the power distribution lines 4-1 and 4-2 via transformers. In addition to loads being connected to the low-voltage power distribution lines, distributed power supplies such as photovoltaic power-generation devices are further connected thereto. That is, in the present embodiment, distributed power supplies are connected to the low-voltage system. However, the present embodiment can also be applied to the case where distributed power supplies are not included in the low-voltage system. As an example of the distributed power supply, a photovoltaic power-generation device is described below. Voltage control in a power distribution system means voltage control in a high-voltage system. This power distribution system is configured to include the voltage control apparatuses 1, 5, and 6, the local voltage control devices 11, 15, and 16, the bus-bar 2, the breakers 3-1 and 3-2, the power distribution lines 4-1 and 4-2, and the voltage and power-flow measurement devices 10.

While in the illustrated example, two power distribution lines are connected to the bus-bar 2, the number of power distribution lines is not limited to this example. Further, the number of voltage control apparatuses to be provided is not limited to the illustrated example. Aside from the LRT, SVR, and SVC illustrated as an example in FIG. 1, other voltage control apparatuses, such as an ShR shunt reactor (ShR) and a PCS (Power Conditioning System: power conditioner) with a reactive-power modifying function, can also be provided depending on the configuration.

The centralized voltage control device (voltage monitoring control device) 8 is connected to the local voltage control devices 11, 15, and 16 and the voltage and power-flow measurement devices 10 via the communication network 7. The communication network 7 is, for example, a dedicated network and is provided for the purpose of monitoring and controlling the power distribution system. For example, on the basis of the measurement information transmitted from the voltage and power-flow measurement devices 10, the centralized voltage control device 8 determines a command value that is a control target for each local voltage control device, for example, every centralized-control cycle (one-hour cycle, for example). The centralized voltage control device 8 then indicates the command value individually to each local voltage control device via the communication network 7. The centralized voltage control device 8 indicates the voltage upper-limit value and the voltage lower-limit value (hereinafter, also "voltage upper and lower limit values"), which specify the voltage range, as a command value to the local voltage control devices (the local voltage control devices 11 and 15 in the example of FIG. 1) that control the transformer-type voltage control apparatuses (the voltage control apparatuses 1 and 5 in the example of FIG. 1). The centralized voltage control device 8 indicates the dead zone (width of a control range) as a command value to the local voltage control device (the local voltage control device 16 in the example of FIG. 1) that controls a reactive-power-modified voltage control apparatus (the voltage control apparatus 6 in the example of FIG. 1).

On the basis of the command regarding the voltage upper and lower limit values from the centralized voltage control device 8, each local voltage control device (first voltage control device) that controls a transformer-type voltage control apparatus controls its control-target voltage control apparatus such that the voltage is maintained between the voltage upper and lower limit values. Every time each local voltage control device receives the command regarding the voltage upper and lower limit values from the centralized voltage control device 8, the local voltage control device updates and sets the voltage upper-limit value and the voltage lower-limit value. For example, on the basis of the voltage upper and lower limit values indicated by the centralized voltage control device 8, within the period of the centralized-control cycle during which the voltage upper and lower limit values are used, the local voltage control device 11 adjusts the amount of control (the amount of change of the tap position) of the voltage control apparatus 1 every local-control cycle (second cycle), which is shorter than the centralized-control cycle (first cycle), such that the voltage on the secondary side of the voltage control apparatus 1 falls between the voltage upper and lower limit values (within a control-target voltage range).

Each local voltage control device (second voltage control device) that controls a reactive-power-modified voltage control apparatus controls a voltage control apparatus that is a control target on the basis of the dead zone (the upper dead zone and the lower dead zone) indicated by the centralized voltage control device 8 and on the basis of the control target value set by the device itself. Specifically, each local voltage control device controls the voltage control apparatus every local-control cycle (third cycle), which is shorter than the centralized-control cycle (first cycle), such that the voltage on the secondary side of the voltage control apparatus falls between the voltage, obtained by subtracting the lower dead zone from the control target value, and the voltage, obtained by adding the upper dead zone to the control target value.

While in the illustrated example, two power distribution lines are connected to the bus-bar 2, the number of power distribution lines is not limited to this example. Further, the number of voltage control apparatuses to be provided and the number of the voltage and power-flow measurement devices 10 are not limited to the illustrated example.

Figure 2:
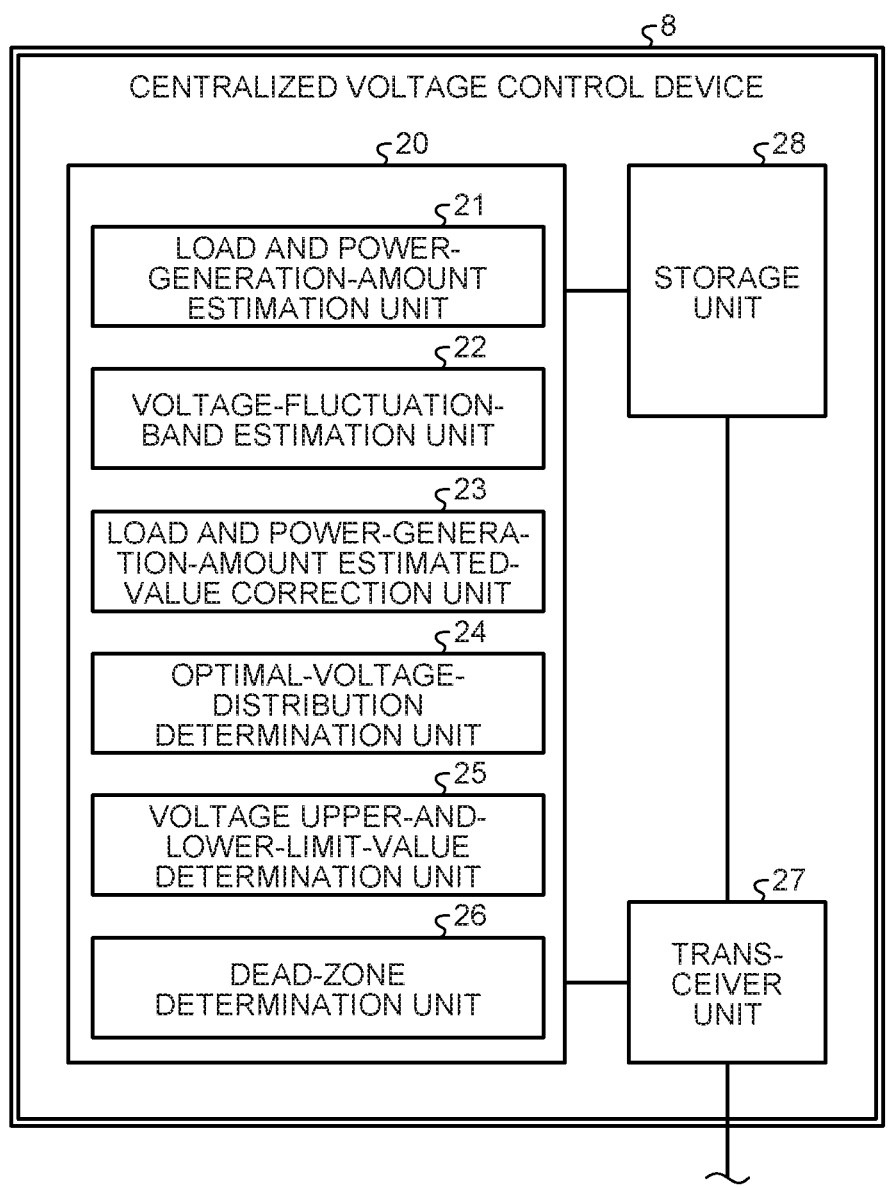
FIG. 2 is a diagram illustrating an example of an internal configuration of a centralized voltage control device.

FIG. 2 is a diagram illustrating an example of the internal configuration of the centralized voltage control device 8. As illustrated in FIG. 2, the centralized voltage control device 8 includes a control unit 20, a storage unit 28, which is connected to the control unit 20, and a transceiver unit 27. The transceiver unit 27 is connected to the control unit 20, the storage unit 28, and the communication network 7, and communicates with each local voltage control device.

The functional configuration of the control unit 20 includes a load and power-generation-amount estimation unit 21, a voltage-fluctuation-band estimation unit 22, a load and power-generation-amount estimated-value correction unit 23, an optimal-voltage-distribution determination unit (control-target-voltage determination unit) 24, a voltage upper-and-lower-limit-value determination unit 25, and a dead-zone determination unit 26. The load and power-generation-amount estimation unit 21 estimates the future load/power-generation-amount distribution in the power distribution system for such as the following day, for example, every centralized-control cycle (one-hour cycle, for example). The load/power-generation amount is equivalent to the amount obtained by subtracting the power-generation amount from the pure load. When the load/power-generation amount is a positive value, this positive value is a load amount. When the load/power-generation amount is a negative value, this negative value is a power-generation amount. A method for estimating a load/power-generation-amount distribution is described later in detail. The voltage-fluctuation-band estimation unit 22 estimates the voltage fluctuation band at each point of the power distribution system on the basis of the power-flow calculation. A method for estimating a voltage fluctuation band is described later. The load and power-generation-amount estimated-value correction unit 23 corrects the estimated value of the load/power-generation-amount distribution within the period of the centralized-control cycle on the basis of the comparison result between the actual value of the load/power-generation-amount distribution within the period of the immediately-previous centralized-control cycle and the estimated value within the corresponding period. The actual value of the load/power-generation-amount distribution is calculated on the basis of the measurement information.

The optimal-voltage-distribution determination unit 24 performs power-flow calculation on the basis of the corrected estimated value of the load/power-generation-amount distribution. Also, taking into account the voltage fluctuation band estimated by the voltage-fluctuation-band estimation unit 22, the optimal-voltage-distribution determination unit 24 searches for the best solution for optimizing the value of an evaluation function for evaluating the voltage distribution in the power generation system. Accordingly, the optimal-voltage-distribution determination unit 24 determines the optimal voltage distribution within the period of the centralized-control cycle and the optimal control amount of each voltage control apparatus. The optimal voltage distribution is the voltage distribution at each point of the system, which satisfies restraining conditions and optimizes the evaluation function. The optimal control amount is the amount of control to be indicated to each voltage control apparatus so as to achieve the optimal voltage distribution, i.e., a control-target voltage. This control-target voltage itself may be indicated as the amount of control to each voltage control apparatus. However, in the case of a transformer-type voltage control apparatus, it is not preferable to frequently change the tap position. Therefore, in the present embodiment, the centralized voltage control device 8 defines a control-target range as described below on the basis of the optimal control amount being equal to the control-target voltage and indicates the defined control-target range. A local voltage control device that controls the voltage of each transformer-type voltage control apparatus controls the voltage such that it is maintained within the control-target range.

On the basis of the determined optimal voltage distribution, the voltage upper-and-lower-limit-value determination unit 25 determines the voltage upper and lower limit values that are the upper limit and the lower limit of the control-target voltage range of each local voltage control device within the period of the centralized-control cycle. The voltage upper-and-lower-limit-value determination unit 25 then indicates these limit values to each local voltage control device via the communication network 7. The processing for determining the voltage upper and lower limit values performed by the voltage upper-and-lower-limit-value determination unit 25 is described later in detail. The outline of this processing is described as follows.

First, the voltage upper-and-lower-limit-value determination unit 25 obtains, from the storage unit 28, information regarding the region responsible for voltage control, which is assigned to each local voltage control device in advance. The region responsible for voltage control is a region (or a section) on the power distribution line 4-1 or 4-2 where a local voltage control device to which the region is assigned or a voltage control apparatus connected to this local voltage control device has the responsibility of controlling the voltage within the region.

A reactive-power-controlled voltage control apparatus sets, when there is a transformer-type voltage control apparatus on the power-supply side (on the upstream side where there is a power-distribution transformer) of the reactive-power-controlled voltage control apparatus, the region up to the load side (the downstream side) of the transformer of this transformer-type voltage control apparatus and the region on the load side of the reactive-power-controlled voltage control apparatus as the region responsible for voltage control. When there is an additional voltage control apparatus on the load side, the reactive-power-controlled voltage control apparatus includes the region up to the power-supply side of the additional voltage control apparatus in the region responsible for voltage control. A transformer-type voltage control apparatus, for example, sets the load side of the transformer as the region responsible for voltage control. However, in the case where there is an additional voltage control apparatus on the load side, the transformer-type voltage control apparatus sets the region up to the power-supply side of the additional voltage control apparatus as the region responsible for voltage control. The method for setting a region responsible for voltage control is not limited to the above example.

An appropriate voltage range is preset for each region responsible for voltage control. This appropriate voltage range is an appropriate voltage range that the high-voltage system should maintain. The optimal voltage of a voltage control apparatus is acquired so as to fall within an appropriate voltage range in the region responsible for voltage control. The difference between the optimal voltage and the lower-limit value of an appropriate voltage is referred to as a "voltage lower-limit allowable amount". The difference between the optimal voltage and the upper-limit value of an appropriate voltage is referred to as a "voltage upper-limit allowable amount".

The voltage upper-and-lower-limit-value determination unit 25 determines the voltage upper and lower limit values for a local voltage control device that controls a transformer-type voltage control apparatus on the basis of the optimal voltage acquired by the optimal-voltage-distribution determination unit 24 and on the basis of the minimum value of the voltage upper and lower limit allowable amounts within the region responsible for voltage control.

On the basis of the determined optimal voltage distribution, the dead-zone determination unit 26 determines the dead zone for each local voltage control device within the period of the corresponding centralized-control cycle and indicates the dead zone to each local voltage control device via the communication network 7. Specifically, the dead-zone determination unit 26 determines the upper dead zone and the lower dead zone on the basis of the minimum value of the voltage upper-limit allowable amount and the minimum value of the voltage lower-limit allowable amount within the region responsible for voltage control. The determination processing in the dead-zone determination unit 26 is described later in detail.

The centralized voltage control device 8 can, for example, be configured as a server including a CPU, a memory, a storage device such as a hard disk, and a communication function. The control unit 20 is realized by a CPU that performs control processing according to a control program stored in the memory. The storage unit 28 collectively represents the memory, the storage device, and other devices. The transceiver unit 27 represents a communication function. The centralized voltage control device 8 can, for example, be provided in a substation.

Next, an operation in the present embodiment is described. In the present embodiment, the centralized voltage control device 8 controls each local voltage control device every centralized-control cycle. Therefore, in the centralized control executed by the centralized voltage control device 8, voltage fluctuations with a cycle shorter than the centralized-control cycle (short-cycle fluctuations) cannot be suppressed. In a transformer-type voltage control apparatus, because it is not desirable to change the tap position frequently, it is difficult to remove short-cycle fluctuations. A reactive-power-controlled voltage control apparatus is capable of removing short-cycle fluctuations by local control. However, if a moderate voltage change and short-cycle fluctuations are both suppressed by a reactive-power-controlled voltage control apparatus, the voltage control apparatus having a large capacitance is required; therefore, the cost of the device increases. In the present embodiment, in order to suppress cost increases, a voltage change with a short cycle is absorbed by a reactive-power-controlled voltage control apparatus, while a moderate voltage change is absorbed by a transformer-type voltage control apparatus. In this case, concerning a transformer-type voltage control apparatus, when the centralized voltage control device 8 determines the amount of control to be indicated such that only a moderate voltage change is suppressed, there is a possibility of the occurrence of voltage violation (a deviation from an appropriate voltage range) due to the influence of short-cycle fluctuations. Therefore, in the present embodiment, the fluctuation band of short-cycle fluctuations (a voltage fluctuation band) is estimated and the amount of control to be indicated is determined by taking into account the voltage upper and lower limit allowable amounts equivalent to the voltage fluctuation band.

Figure 3:
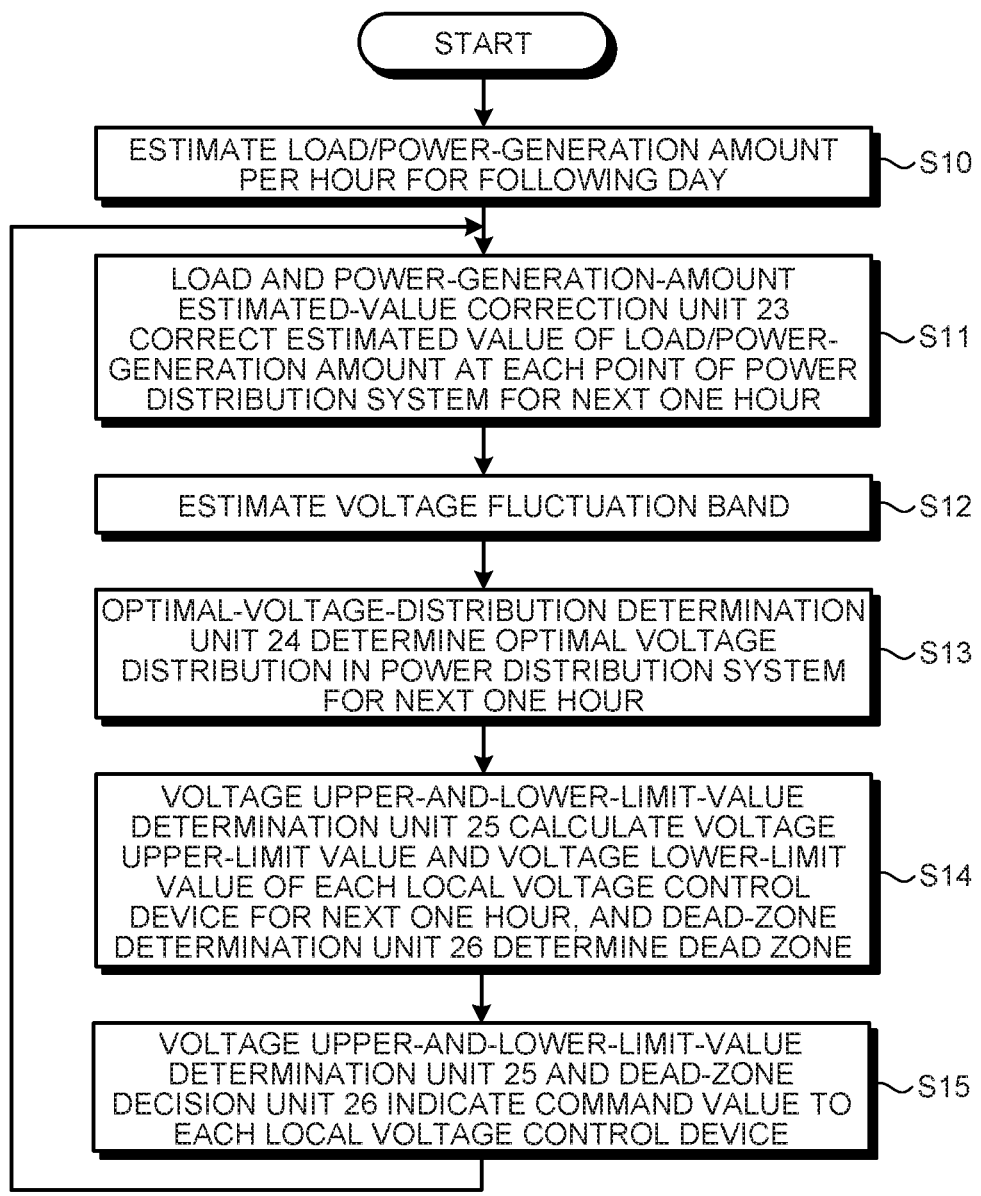
FIG. 3 is a flowchart describing a voltage-control operation in the present embodiment.

FIG. 3 is a flowchart describing a voltage-control operation in the present embodiment. In the present embodiment, the future load/power-generation-amount distribution in the power distribution system is estimated every day (every 24 hours) (fourth cycle). FIG. 3 illustrates a voltage-control operation for one day. As illustrated in FIG. 3, the load and power-generation-amount estimation unit 21 estimates the load/power-generation-amount distribution in the power distribution system, for example per hour, for the following day on the basis of the load and power-generation amount data at each point of the power distribution system that has been saved in the storage unit 28 (Step S10).

In this case, specifically, in order to separately estimate the load and the power-generation amount, for example, the load and power-generation-amount estimation unit 21 first uses the load and power-generation amount data only in a time slot when the sky is clear among all the load and power-generation amount data saved in the storage unit 28 and then excludes, from the load and power-generation amount data, a theoretical power-generation amount (calculated on the basis of the photovoltaic power-generation rated capacity, solar-panel setting angle, latitude, date and time, estimated temperature, and power-generation efficiency) to calculate the actual load amount that is a pure load amount.

On the basis of the measurement information (voltage and power flow) received from the voltage and power-flow measurement devices 10, the load and power-generation-amount estimation unit 21 in the centralized voltage control device 8, for example, calculates the difference between the power-flow mean values at adjacent measurement points in order to acquire a load/power-generation amount at each point of the power distribution system. This load/power-generation amount (the actual load amount and the theoretical power-generation amount) at each point of the power distribution system is saved as load and power-generation amount data in the storage unit 28. The load and power-generation-amount estimation unit 21 in the centralized voltage control device 8 also obtains actual measurement values of temperature and weather and saves the temperature in association with the load and power-generation amount data. It is satisfactory if the temperature and weather obtaining cycle is set equal to or shorter than the centralized-control cycle. The load/power-generation amount (load and power-generation amount data) is equivalent to, for example, the amount obtained by subtracting the power-generation amount from the pure load and can take a positive or negative value depending on the balance between the load amount and the power-generation amount. The load and power-generation amount data is regularly saved and is converted into a database. The load and power-generation amount data is saved for each weekday/weekend category.

The load and power-generation-amount estimation unit 21 estimates the load/power-generation amount mean-value (mean-load and mean-power-generation) distribution in each time slot for the following day. Also, by taking into account the fluctuations during each time slot for the following day, the load and power-generation-amount estimation unit 21 estimates the minimum-load and maximum-power-generation distribution and the maximum-load and minimum-power-generation distribution in each time slot. Specifically, the mean value of load amounts (mean load amount) is a mean value of the above actual load amounts calculated on the basis of the load and power-generation amount data in the same time slot on the same day of the week (weekday/weekend) saved in the storage unit 28. The mean value is a mean value within a time slot (for example, one hour) and is not a simple average of the minimum and maximum values. The maximum load amount and the minimum load amount are respectively the maximum value and the minimum value of the above actual load amounts calculated on the basis of the load and power-generation amount data in the same preceding time slot saved in the storage unit 28.

The load and power-generation-amount estimation unit 21 may collect actual load amounts, for example, for multiple days, acquire a correlation between the load amount and the temperature in the same time slot on the same day of the week (weekday/weekend category), and store this correlation as a relational expression acquired by regression analysis or the like or in the form of a table. Then, on the basis of this correlation and the estimated temperature for the following day, the load and power-generation-amount estimation unit 21 may estimate the load amount (mean load amount) at each point of the power distribution system per hour for the following day, and estimate temperature fluctuations in a time slot to determine the maximum load amount and the minimum load amount on the basis of this estimation result and the above correlation.

Specifically, the maximum power-generation amount and the minimum power-generation amount are an estimated maximum photovoltaic power-generation amount and an estimated minimum photovoltaic power-generation amount, respectively, which are estimated on the basis of the weather (amount of solar radiation) forecast in each time slot for the following day. The maximum power-generation amount and the minimum power-generation amount are estimated specifically as described below, for example. In the following descriptions, each individual time slot that is a target of estimation is referred to as "managed time slot". The method for estimating the photovoltaic power-generation amount is not limited to the examples described below.

In the case where no solar radiation can be expected because, for example, it rains throughout a managed time slot,
Maximum power-generation amount=minimum power-generation amount=mean power-generation amount=0

In the case where perfect solar radiation can be expected in a managed time slot, for example, when sky is clear,
Maximum power-generation amount=minimum power-generation amount=mean power-generation amount=power-generation estimation with the assumption of 100%, solar radiation in managed time slot
In other cases where solar radiation in a managed time slot is not consistent,
Maximum power-generation amount=power-generation estimation with the assumption of 100% solar radiation in managed time slot
Minimum power-generation amount=0 or maximum power-generation amount×α % (for example, α=10) approximately (with weather forecast that indirect light is expected throughout managed time slot)
Mean power-generation amount=estimated value of power generation based on mean estimated amount of solar radiation in managed time slot In the present embodiment, a load/power-generation-amount distribution per hour for the following day is estimated, for example, every day. However, the present invention is not limited thereto, and, for example, a load/power-generation-amount distribution for each given future period can be estimated. This one-hour period or given period is equivalent to the centralized-control cycle described above. The load/power-generation amount is estimated, for example, every hour; however, the load and power-generation amount data is stored in the form of a database for each measurement value of voltage and power flow, i.e., as a value per minute, for example. The reasons for doing this are to, when acquiring a correlation between the load amount and the temperature in the same time slot on the same day of the week (weekday/weekend category), improve the accuracy of the correlation by increasing the number of pieces of measurement data and to identify the extent of fluctuations in the load amount for one hour. Further, the extent of fluctuations in the load amount for one hour can be used for acquiring the voltage fluctuation band due to short-cycle fluctuations described later.

Next, the load and power-generation-amount estimated-value correction unit 23 corrects the estimated value of the load/power-generation amount in the power distribution system for the next one hour (Step S11). Specifically, concerning the mean value of the load/power-generation amount at each point of the power distribution system for the past one hour, the load and power-generation-amount estimated-value correction unit 23 compares the actual value (calculated on the basis of the measurement information received in the past one hour) with the estimated value to acquire the ratio between the actual value and the estimated value. The load and power-generation-amount estimated-value correction unit 23 then multiplies each estimated value of the load/power-generation-amount distribution (a mean-load and mean-power-generation-amount distribution, a minimum-load-amount and maximum-power-generation-amount distribution, and a maximum-load-amount and minimum-power-generation-amount distribution) for the next one hour by this ratio to correct the estimated value of the load/power-generation amount at each point of the power distribution system for the next one hour. With this correction, the accuracy of the estimated value is expected to improve.

Subsequently, the voltage-fluctuation-band estimation unit 22 estimates the voltage fluctuation band at each point of the power distribution system for the next one hour, for both a voltage rise (upper side) and a voltage drop (lower side) (Step S12). Specifically, the power flow in the power distribution system is calculated and the voltage value at each point of the power distribution system is calculated for each of the three cases described below. A reactive-power-modified voltage control apparatus is capable of outputting reactive power in a preset range (between the maximum value of reactive power absorption and the maximum value of reactive power discharge).

(1) Mean-load and mean-power-generation distribution with reactive-power output of reactive-power-modified voltage control apparatus=0
(2) Minimum-load and maximum-power-generation distribution with reactive-power output of reactive-power-modified voltage control apparatus=maximum value of reactive power absorption by reactive-power-modified voltage control apparatus
(3) Maximum-load and minimum-power-generation distribution with reactive-power output of reactive-power-modified voltage control apparatus=maximum value of reactive power discharge by reactive-power-modified voltage control apparatus Next, the voltage-fluctuation-band estimation unit 22 calculates the upper intra-system voltage fluctuation band on the basis of the difference in voltage between the case (1) and the case (2) and calculates the lower intra-system voltage fluctuation band on the basis of the difference in voltage between the case (1) and the case (3), at each point of the power distribution system. In the manner described above, the voltage fluctuation band at each point of the power distribution system, attributable to factors in the power distribution system, is calculated. Further, a maximum voltage change in a higher-order system (the primary side of the voltage control apparatus 1) is added to the calculated voltage fluctuation band. The maximum voltage change in a higher-order system is estimated in advance by analyzing the preceding actual voltage-measurement at each point of the power distribution system. It is assumed that the maximum voltage change in a higher-order system is set in the centralized voltage control device 8 by an operator or the like. The voltage-fluctuation-band estimation unit 22 adds the maximum voltage change (rising side) in a higher-order system to the upper intra-system voltage fluctuation band to calculate the upper voltage fluctuation band. Also, the voltage-fluctuation-band estimation unit 22 adds the maximum voltage change (dropping side) in a higher-order system to the lower intra-system voltage fluctuation band to calculate the lower voltage fluctuation band.

Figure 4:
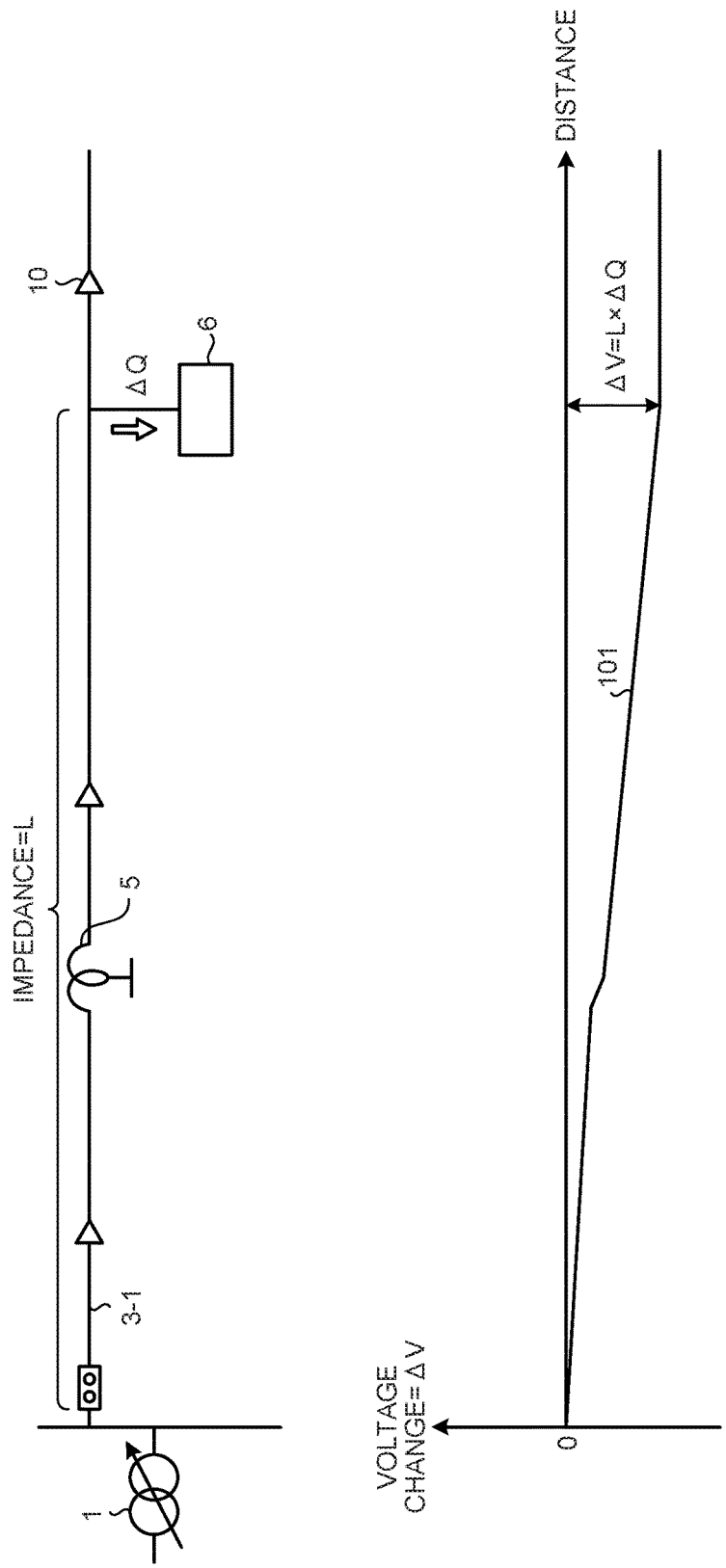
FIG. 4 is a diagram illustrating an example of voltage compensation by a reactive-power-modified voltage control apparatus.

FIG. 4 is a diagram illustrating an example of voltage compensation by a reactive-power-modified voltage control apparatus. As illustrated in FIG. 4, an impedance L depends on the distance from the substation (the voltage control apparatus 1). Therefore, as illustrated in FIG. 4 as a voltage drop 101, when the reactive-power-modified voltage control apparatus 6 absorbs reactive power $\Delta Q$, the amount of voltage drop $\Delta V = L \times \Delta Q$ at each point of the system becomes greater as the points get closer to the distal end (further from the substation).

Figure 5:
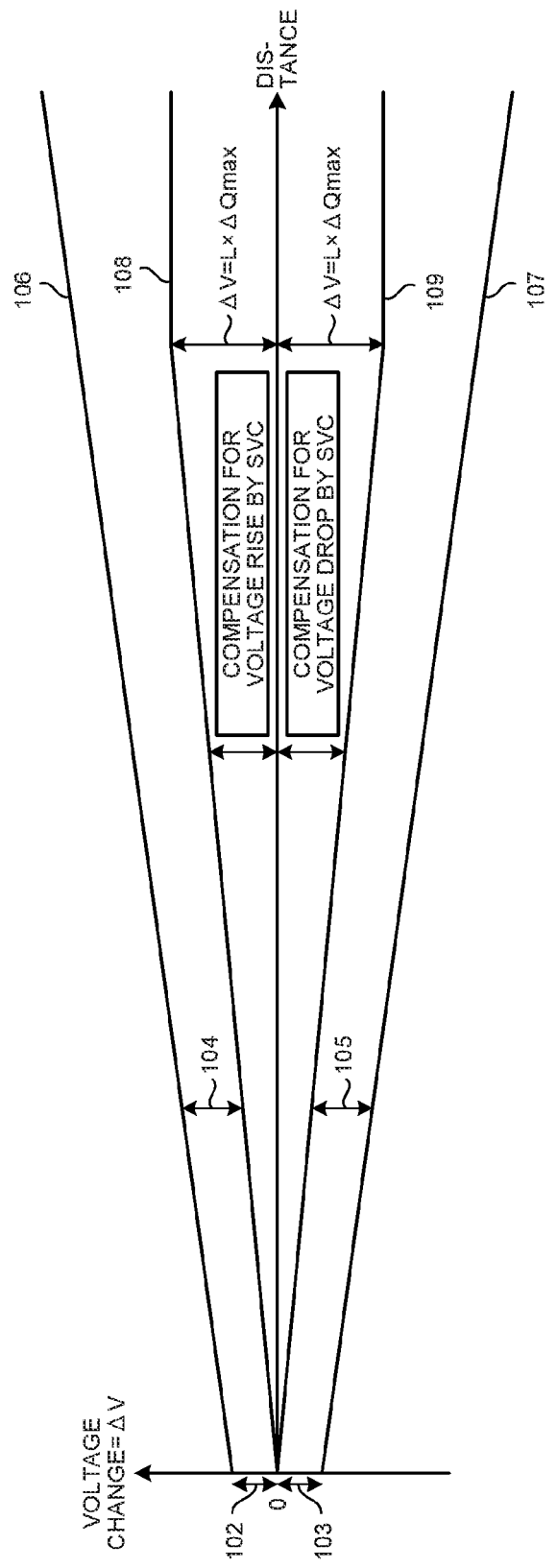
FIG. 5 is a diagram for explaining a method for setting an upper voltage fluctuation band and a lower voltage fluctuation band in the present embodiment.

FIG. 5 is a diagram for explaining the method for setting the upper voltage fluctuation band and the lower voltage fluctuation band in the present embodiment. In FIG. 5, for the sake of simplicity, the impedance of the voltage control apparatus 5 is ignored. Similarly to FIG. 4, the horizontal axis in FIG. 5 represents the distance from the substation (the voltage control apparatus 1). In FIG. 5, the vertical axis represents the voltage change relative to the mean-load and mean-power-generation distribution. A voltage change 106 shows the maximum voltage change on the rising side at each point of the system when the reactive-power output of the reactive-power-modified voltage control apparatus 6 is equal to zero. The voltage change 106 shows the voltage change after adding a maximum voltage change (rising side) 102 in a higher-order system (that is, the voltage change obtained by adding the maximum voltage change (rising side) 102 in a higher-order system to the voltage change when the reactive-power output is equal to zero with the minimum-load and maximum-power-generation distribution). A voltage change 107 shows the maximum voltage change on the dropping side at each point of the system when the reactive-power output of the reactive-power-modified voltage control apparatus 6 is equal to zero. The voltage change 107 shows the voltage change after adding a maximum voltage change (dropping side) 103 in a higher-order system (that is, the voltage change that is obtained by lowering the voltage change when the reactive-power output is equal to zero with the maximum-load and minimum-power-generation distribution by the maximum voltage change (dropping side) 103 in a higher-order system).

A voltage change 108 shows the voltage rise caused by the reactive-power-modified voltage control apparatus 6 when the voltage control apparatus 6 discharges maximum reactive power Qmax. The voltage control apparatus 6 (abbreviated as "SVC" in FIG. 5) compensates for the voltage rise in a range between the voltage change "0" and the voltage change 108. A voltage change 109 shows the voltage drop caused by the reactive-power-modified voltage control apparatus 6 when the voltage control apparatus 6 absorbs the maximum reactive power Qmax. The voltage control apparatus 6 compensates for the voltage drop in a range between the voltage change "0" and the voltage change 109. Therefore, if it is assumed that the reactive-power-modified voltage control apparatus 6 compensates for the voltage rise, an allowance for the upper limit value of an appropriate voltage range, which needs to be ensured at each point of the system, is a difference 104 between the voltage change 106 and the voltage change 108. Similarly, if it is assumed that the reactive-power-modified voltage control apparatus 6 compensates for a voltage drop, an allowance for the lower limit value of an appropriate voltage range, which needs to be ensured at each point of the system, is a difference 105 between the voltage change 107 and the voltage change 109. The difference 104 is the upper voltage fluctuation band obtained by adding the maximum voltage change (rising side) in a higher-order system to the difference in voltage between the case (1) and the case (2). The difference 105 is the lower voltage fluctuation band obtained by adding the maximum voltage change (dropping side) in a higher-order system to the difference in voltage between the case (1) and the case (3).

Therefore, in the present embodiment, the upper voltage fluctuation band and the lower voltage fluctuation band are calculated as described above as a voltage fluctuation band remaining when the reactive-power-modified voltage control apparatus 6 compensates for a voltage rise and a voltage drop for voltage fluctuations with a short cycle.

While in the example of FIG. 5, the discharged maximum reactive power and the absorbed maximum reactive power are both represented as Qmax, the discharged maximum reactive power can be different from the absorbed maximum reactive power. When the discharged maximum reactive power is different from the absorbed maximum reactive power, the voltage control apparatus 6 compensates for the voltage rise in a range different from compensation for the voltage drop.

Next, the optimal-voltage-distribution determination unit 24 determines the optimal voltage distribution in the power distribution system for the next one hour on the basis of the corrected estimated value of the load/power-generation amount at each point of the power-distribution system for the next one hour that is created at Step S11 (Step S13). This processing is described later in detail with reference to FIG. 6. The processing at Step S11 for correcting the estimated value of the load/power-generation amount may be omitted and the optimal-voltage-distribution determination unit 24 may determine the optimal voltage distribution in the power distribution system for the next one hour on the basis of the estimated value of the load/power-generation amount at each point of the power distribution system for the following day that is created at Step S10.

Subsequently, on the basis of the optimal voltage distribution in the power distribution system, the voltage upper-and-lower-limit-value determination unit 25 and the dead-zone determination unit 26 determine a command value to be indicated to each local voltage control device for the next one hour (Step S14). Specifically, the voltage upper-and-lower-limit-value determination unit 25 calculates the voltage upper-limit value and the voltage lower-limit value as a command value for each local voltage control device that controls a transformer-type voltage control apparatus. The dead-zone determination unit 26 calculates the upper dead zone and the lower dead zone as a command value for each local voltage control device that controls a reactive-power-modified voltage control apparatus.

Next, the voltage upper-and-lower-limit-value determination unit 25 and the dead-zone determination unit 26 indicate the command values to each local voltage control device (Step S15), Specifically, the voltage upper-and-lower-limit-value determination unit 25 indicates the voltage upper-limit value and the voltage lower-limit value to each local voltage control device that controls a transformer-type voltage control apparatus, and the dead-zone determination unit 26 indicates the upper dead zone and the lower dead zone to each local voltage control device that controls a reactive-power-modified voltage control apparatus.

On the basis of the command regarding the voltage upper and lower limit values from the centralized voltage control device 8, each local voltage control device that controls a transformer-type voltage control apparatus adjusts the amount of control of the voltage control apparatus that is a control target. More specifically, each local voltage control device adjusts the amount of control of a voltage control apparatus as required every local-control cycle that is shorter than the centralized-control cycle (one hour) in such a manner as to maintain the voltage between the voltage upper and lower limit values. Every time a command regarding the voltage upper and lower limit values is received from the centralized voltage control device 8 every centralized-control cycle, each local voltage control device updates and sets the voltage upper-limit value and the voltage lower-limit value.

Each local voltage control device that controls a reactive-power-modified voltage control apparatus sets a voltage, obtained by adding the upper dead zone to the control target value set by the device itself (for example, the first-order lag in voltage with a time constant of approximately several tens of minutes), as the upper limit of the control range, sets a voltage, obtained by subtracting the lower dead zone from the control target value, as the lower limit of the control range, and controls the amount of control of each voltage control apparatus such that the voltage of each voltage control apparatus that is a control target falls within this control range. In this manner, a reactive-power-modified voltage control apparatus operates such that it compensates for the voltage change that may cause voltage deviation from the upper and lower limits at any point of the power distribution line 4-1, thereby preventing the voltage of a transformer-type voltage control apparatus from reaching the upper and lower-limit values. This operation is effective in minimizing reactive-power loss.

Figure 6:
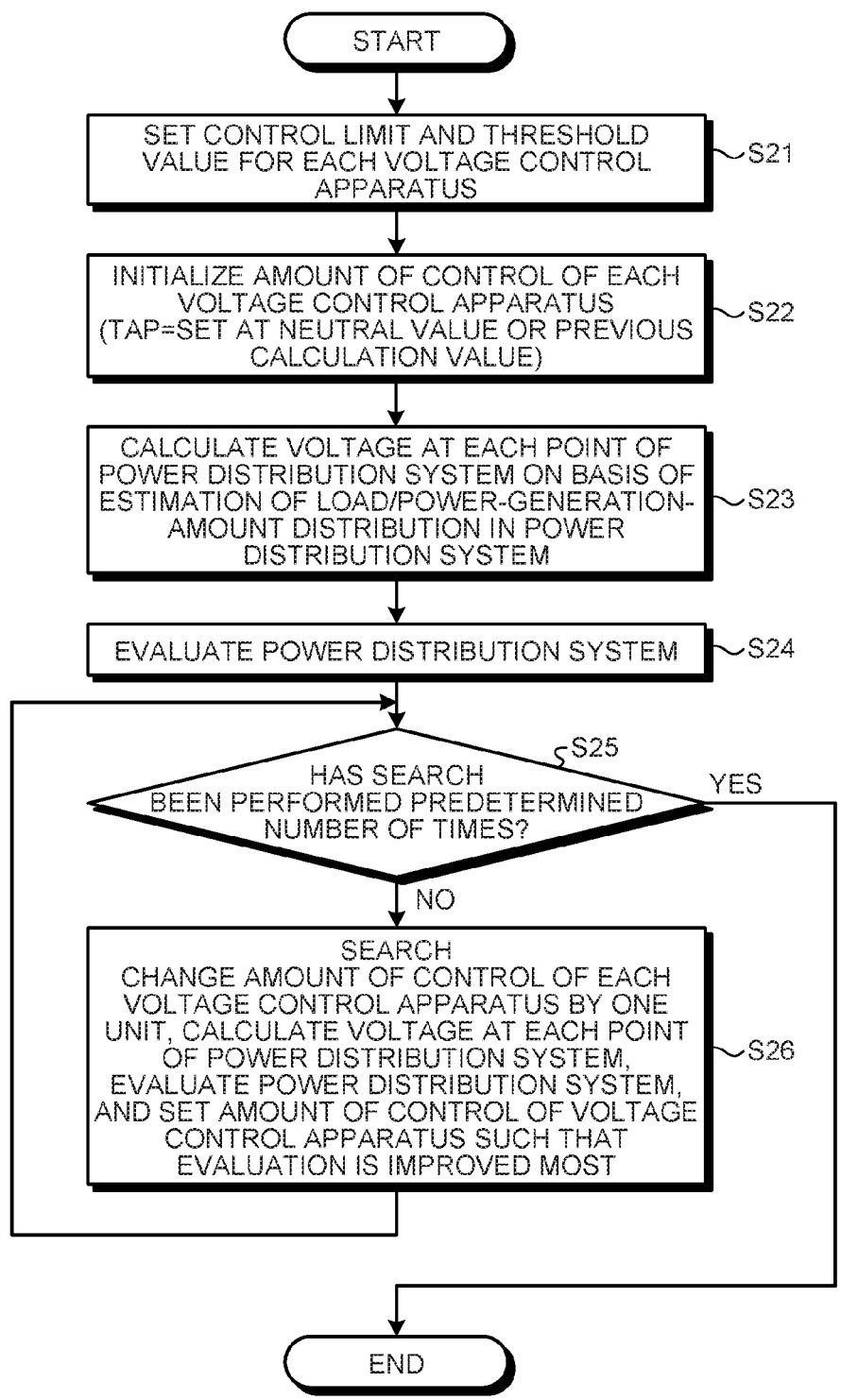
FIG. 6 is a flowchart for calculating an optimal voltage distribution in a power distribution system for the next one hour.

Next, the processing at Step S13 in FIG. 3 is described in detail. FIG. 6 is a flowchart describing the processing at Step S13 in FIG. 3 in detail and illustrates the flow for calculating the optimal voltage distribution in the power distribution system for the next one hour.

First, the optimal-voltage-distribution determination unit 24 sets a control limit for each voltage control apparatus (tap upper and lower limits in the case of a transformer-type voltage control apparatus), and sets a threshold value for the voltage allowance (Step S21). The threshold value for the voltage allowance is determined on the basis of the upper voltage fluctuation band and the lower voltage fluctuation band.

Next, the optimal-voltage-distribution determination unit 24 initializes the amount of control of each voltage control apparatus (Step S22). In this case, in the case of a transformer-type voltage control apparatus, the optimal-voltage-distribution determination unit 24 sets the tap position to, for example, a calculation value obtained when the optimal voltage distribution one hour before is calculated (or a neutral value when there is no previous calculation value). In the case of a reactive-power-modified voltage control apparatus, the reactive-power output is set to zero.

Subsequently, on the basis of the estimation of the load/power-generation-amount distribution at each point of the power distribution system, the optimal-voltage-distribution determination unit 24 performs a power-flow calculation with the set amount of control (the tap position) of each voltage control apparatus to calculate the voltage at each point of the power distribution system (Step S23). In the case, the mean-load and mean-power-generation-amount distribution is used as the load/power-generation-amount distribution at each point of the power distribution system.

Next, the optimal-voltage-distribution determination unit 24 evaluates the power distribution system on the basis of the result of the power-flow calculation (Step S24). Specifically, the optimal-voltage-distribution determination unit 24 evaluates the power distribution system by evaluating the values of evaluation functions (objective functions) that are set for evaluation items of the power distribution system. The first priority evaluation item is the amount of violation (deviation) of the voltage at each point of the power distribution system from an appropriate voltage range (an appropriate-voltage upper-limit value and an appropriate-voltage lower-limit value). That is, the optimal voltage distribution is initially determined in such a manner as to minimize the sum of the amounts of violation (deviation) of the voltage at each point of the power distribution system from the appropriate voltage range.

The second priority evaluation item is, for example, the voltage allowance (an allowable amount for the appropriate-voltage upper and lower limit values) at each point of the power distribution system. When the voltage allowance at each point of the power distribution system is small, the voltage deviates from the appropriate voltage range even upon slight voltage fluctuations. This causes a voltage control apparatus to operate frequently. Therefore, evaluation is higher as the sum of the voltage allowances is larger. In the case where an evaluation function that leads to an optimal solution when the evaluation function takes a minimum is used, the voltage allowance is evaluated using the amount of decrease in voltage allowance that is defined as follows. The amount of decrease in voltage allowance is calculated as described below in such a manner that it becomes zero when the voltage allowance is sufficiently large and becomes greater as the voltage allowance is smaller.

Amount of decrease in voltage allowance=threshold value−voltage allowance, where voltage allowance<threshold value Amount of decrease in voltage allowance=0, where voltage allowance≥threshold value (1)

The threshold value is a value that is set at Step S21 and is the upper voltage fluctuation band and the lower voltage fluctuation band themselves or a value greater than the upper voltage fluctuation band and the lower voltage fluctuation band. For calculating the amount of decrease in voltage allowance described above, the upper voltage fluctuation band is used as a threshold value for the voltage allowance for the upper-limit value of an appropriate voltage and the lower voltage fluctuation band is used as a threshold value for the voltage allowance for the lower-limit value of an appropriate voltage.

In each transformer (except a step-down transformer connecting to a lower-voltage system), the sum of the maximum value on the appropriate-voltage upper-limit side and the maximum value on the appropriate-voltage lower-limit side at each point within its region responsible for voltage control is acquired.

In the case where "voltage allowance"<"threshold value" and where the voltage value falls within the appropriate voltage range, the voltage does not deviate from the appropriate voltage range; however, voltage allowance violation occurs (the voltage allowance for short-cycle fluctuations cannot be ensured). Therefore, it is desirable that "voltage allowance"≥"threshold value".

The third priority evaluation item can be the sum of the amounts of change in control amount of a voltage control apparatus from its initial setting value. In the case of a transformer-type voltage control apparatus, the amount of change in control amount of a voltage control apparatus from its initial setting value is a difference in tap position from the initial setting tap position. Decreasing the sum of the amounts of change leads to a reduction in the number of times the voltage control apparatus operates.

Further, the fourth priority evaluation item can be the power transmission loss (active power loss+reactive power loss) in the entire power distribution system. Lower power transmission loss is evaluated higher. The active power loss accounts for the majority of the power transmission loss. As the voltage is higher, the power transmission loss becomes lower. However, when the voltage is higher, the voltage allowance (for the upper-limit value) with the second priority at each point of the power distribution system becomes smaller. Thus, the power transmission loss is an evaluation item that has significance in the case where there is a considerable allowance for the voltage upper and lower limits at each point of the power distribution system.

While an evaluation function can be set for the first priority evaluation item, an evaluation function can also be set for two or more of the evaluation items among the first priority to the fourth priority evaluation items. In this case, a function obtained by weighting each evaluation function and calculating the sum of the evaluation functions is set as an entire evaluation function. Further, depending on the power distribution system, a higher-order priority item can also be included in the evaluation function. The evaluation function can be configured such that the best optimization (highest evaluation) is achieved, for example, when the evaluation function takes a minimum.

For example, in the case of setting an evaluation function on the basis of all the first to fourth priority evaluation items, the evaluation function can be set as expressed in the following equation (2). Wp, W1, W2, and W3 are weighting coefficients.

Evaluation function value=sum of amounts of violation from voltage upper and lower limits at each point of power distribution system×$Wp$+maximum value of amount of decrease in voltage allowance on upper-limit side at each point within region responsible for voltage control of each transformer×$W1$+maximum value of amount of decrease in voltage allowance on lower-limit side at each point within region responsible for voltage control of each transformer×$W1$+amount of change in transformer target voltage from previous command×$W2$+power transmission loss×$W3$ (2)

Next, the optimal-voltage-distribution determination unit 24 determines whether a search has been performed a predetermined number of times (Step S25). When a search has been performed a predetermined number of times (YES at Step S25), the processing ends. When a search has not yet been performed a predetermined number of times (NO at Step S25), the processing proceeds to Step S26.

Subsequently, at Step S26, the optimal-voltage-distribution determination unit 24 changes the amount of control of each voltage control apparatus, for example, by one unit (shifting-up/shifting-down the tap, for example, by a single step) to calculate the voltage at each point of the power distribution system (same as Step S23) and to evaluate the power distribution system (same as Step S24). This processing is performed on all the voltage control apparatuses to compare their evaluation results with each other and to change the setting of the amount of control of the voltage control apparatuses such that the evaluation is improved the most (Step S26). The amount of control of a reactive-power-modified voltage control apparatus is not changed because the optimal voltage distribution is acquired under a condition where "reactive-power output=0". For an optimization algorithm, a method disclosed in, for example, Japanese Patent Application Laid-open No. 2010-250599 can be used. After Step S26, the processing returns to Step S25.

As described above, after performing a search a predetermined number of times, the optimal-voltage-distribution determination unit 24 can determine the optimal voltage distribution in the power distribution system and the optimal control amount of each voltage control apparatus for the next one hour as the best solution for optimizing the value of the evaluation function.

Figure 7:
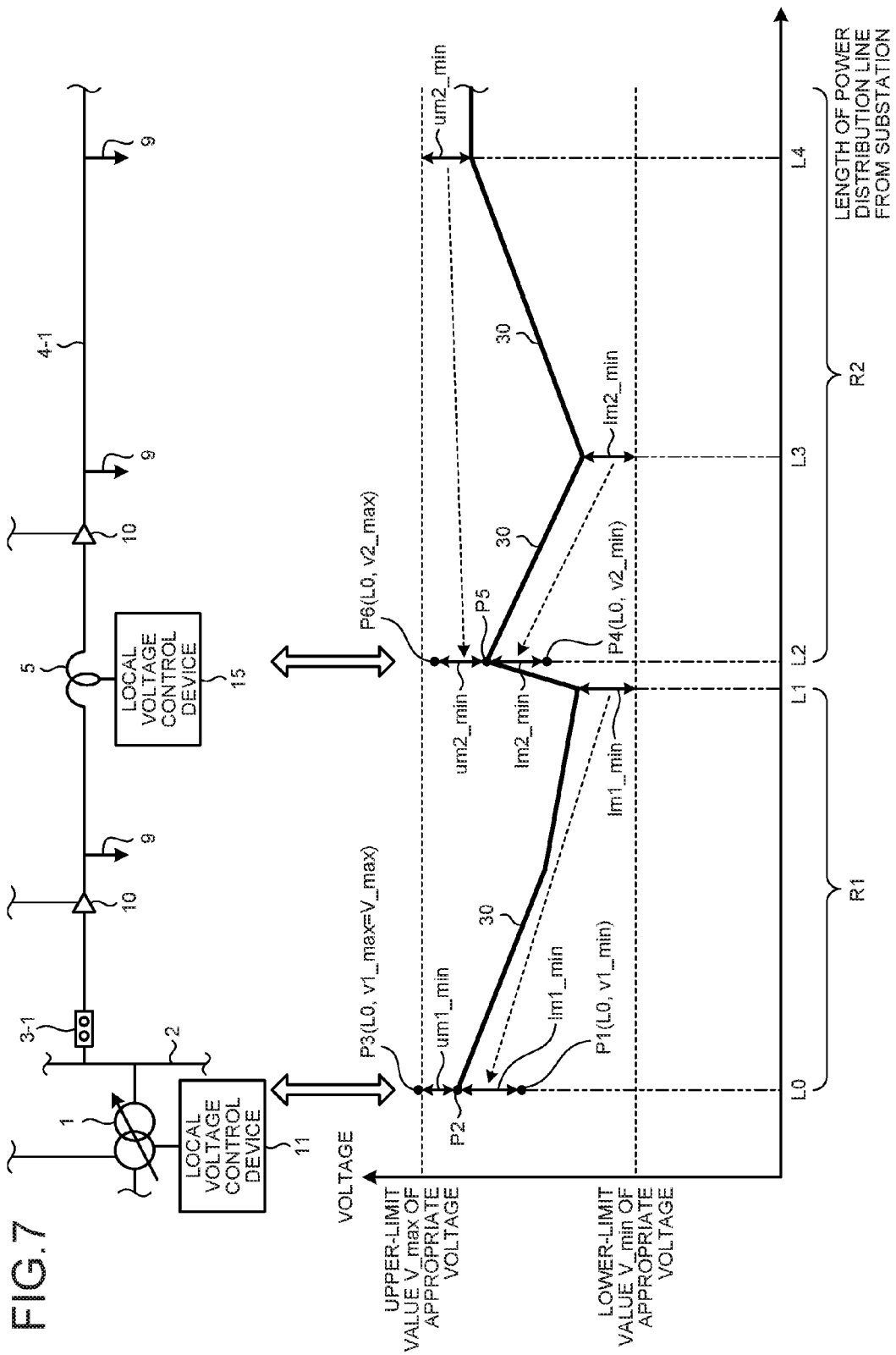
FIG. 7 is a detailed explanatory diagram of processing at Step S14 in FIG. 3.

Next, the processing at Step S14 in FIG. 3 is described in detail. FIG. 7 is a detailed explanatory diagram of the processing at Step S14 in FIG. 3. FIG. 7 illustrates, on its lower side, an optimal voltage 30 relative to the length of the power distribution line 4-1 from the substation. The optimal voltage 30 is acquired by performing the processing at Step S13 in FIG. 3. FIG. 7 also illustrates an upper-limit value V_max and a lower-limit value V_min of an appropriate voltage range. The appropriate voltage range is predetermined depending on the time at each individual load location point as a voltage range that the voltage on the high-voltage side should comply with at each load location point. The appropriate voltage range is set such that power can be stably supplied to the low-voltage side. In FIG. 7, the appropriate voltage range is the same, for example, at each point of the power distribution system. However, it is general that the appropriate voltage range differs at each point of the power distribution system and also changes depending on the time slot.

FIG. 7 illustrates, on its lower side, the secondary side (the load side) of the voltage control apparatus 1 as a starting point (a power-distribution-line length L0), the power-distribution-line length from the starting point to the primary side (the power-supply side) of the voltage control apparatus 5 as L1, and the power-distribution-line length from the starting point to the secondary side of the voltage control apparatus 5 (SVR) as L2.

Each voltage control apparatus has its own individual region responsible for voltage control. The region responsible for voltage control of the voltage control apparatus 1 is a region from the voltage control apparatus 1 to the voltage control apparatus 5 located on the downstream side. FIG. 7 illustrates this region as a region R1 of the power distribution line 4-1 with a power-distribution-line length from L0 to L1. The region responsible for voltage control of the voltage control apparatus 5 is a region from the voltage control apparatus 5 to the next voltage control apparatus located on the downstream side (not illustrated). FIG. 7 illustrates this region as a region R2 of the power distribution line 4-1 with a power-distribution-line length from L2 onward.

The voltage upper-and-lower-limit-value determination unit 25 determines the voltage upper and lower limit values that are upper and lower limits of a control-target voltage range to be indicated to each of the local voltage control devices 11 and 15 in the following manner.

First, the case with the local voltage control device 11 is described. The voltage upper-and-lower-limit-value determination unit 25 selects the minimum value of the voltage upper-limit allowable amount that is the difference between the optimal voltage 30 and the upper-limit value V_max of the appropriate voltage within the region R1, which is the region responsible for voltage control of the local voltage control device 11. In the illustrated example, the minimum voltage-upper-limit allowable amount is given at the point of the power-distribution-line length L0. This value is represented as um1_min. The voltage upper-and-lower-limit-value determination unit 25 selects the minimum value of the voltage lower-limit allowable amount that is the difference between the optimal voltage 30 and the lower-limit value V_min of the appropriate voltage within the region R1, which is the region responsible for voltage control of the local voltage control device 11. In the illustrated example, the minimum voltage-lower-limit allowable amount is given at the point of the power-distribution-line length L1. This value is represented as lm1_min. The voltage upper-and-lower-limit-value determination unit 25 sets a value, obtained by adding the minimum voltage-upper-limit allowable amount um1_min to the value of the optimal voltage 30 of the voltage control apparatus 1, as the voltage upper-limit value of the control-target voltage range. The voltage upper-and-lower-limit-value determination unit 25 sets a value, obtained by subtracting the minimum voltage-lower-limit allowable amount lm1_min from the value of the optimal voltage 30 of the voltage control apparatus 1, as the voltage lower-limit value of the control-target voltage range. More specifically, the value of the optimal voltage 30 of the voltage control apparatus 1 is a value of the optimal voltage 30 on the output side (the load side or the secondary side) of the voltage control apparatus 1 and indicates the voltage value at a point represented by P2 in FIG. 7. The voltage upper-limit value is represented as v1_max. The voltage lower-limit value is represented as v1_min. The control-target voltage range of the local voltage control device 11 is a range between the point P3 and the point P1. In the illustrated example, v1_max=V_max.

In this manner, the control-target voltage range of the local voltage control device 11 is determined by taking into consideration, not only the voltage upper and lower limit allowable amounts near the location point of the voltage control apparatus 1, but also the voltage upper and lower limit allowable amounts at each point within the region R1, which is the region responsible for voltage control of the local voltage control device 11. Therefore, although the local voltage control device 11 itself locally controls the voltage control apparatus 1 within its control-target voltage range, it is still possible to maintain the appropriate voltage within the wide region R1.

Next, the case with the local voltage control device 15 is described. The voltage upper-and-lower-limit-value determination unit 25 selects the minimum value of the voltage-upper-limit allowable amount that is an absolute value of the difference between the optimal voltage 30 and the upper-limit value V_max of the appropriate voltage within the region R2, which is the region responsible for voltage control of the local voltage control device 15. In the illustrated example, the minimum voltage-upper-limit allowable amount is given at the point of a power-distribution-line length L4. This value is represented as um2_min. The voltage upper-and-lower-limit-value determination unit 25 selects the minimum value of the voltage-lower-limit allowable amount that is an absolute value of the difference between the optimal voltage 30 and the lower-limit value V_min of the appropriate voltage within the region R2, which is the region responsible for voltage control of the local voltage control device 15. In the illustrated example, the minimum voltage-lower-limit allowable amount is given at the point of a power-distribution-line length L3. This value is represented as lm2_min. The voltage upper-and-lower-limit-value determination unit 25 sets a value, obtained by adding the minimum voltage-upper-limit allowable amount um2_min to the value of the optimal voltage 30 of the voltage control apparatus 5, as the voltage upper-limit value of the control-target voltage range. The voltage upper-and-lower-limit-value determination unit 25 sets a value, obtained by subtracting the minimum voltage-lower-limit allowable amount lm2_min from the value of the optimal voltage 30 of the voltage control apparatus 5, as the voltage lower-limit value of the control-target voltage range. More specifically, the value of the optimal voltage 30 of the voltage control apparatus 5 is a value of the optimal voltage 30 on the output side (the load side or the secondary side) of the voltage control apparatus 5 and indicates a voltage value at a point represented by P5 in FIG. 7. In the case where a voltage control apparatus is a reactive-power compensator, the optimal voltage of the voltage control apparatus is the optimal voltage at a connection point of the voltage control apparatus to the power distribution system. In FIG. 7, the voltage upper-limit value is represented as v2_max, the voltage lower-limit value is represented as v2_min, and the control-target voltage range of the local voltage control device 15 is the range between the point P4 and the point P6.

In this manner, the control-target voltage range of the local voltage control device 15 is determined by taking into consideration, not only the voltage upper and lower limit allowable amounts near the location point of the voltage control apparatus 5, but also the voltage upper and lower limit allowable amounts at each point within the region R2, which is the region responsible for voltage control of the local voltage control device 15. Therefore, although the local voltage control device 15 itself locally controls the voltage control apparatus 5 within its control-target voltage range, it is still possible to maintain the appropriate voltage within the wide region R2.

Next, an explanation will be made of a method for determining the upper dead zone and the lower dead zone by the dead-zone determination unit 26. Similarly to the determination of the voltage upper and lower limit values in the case of a transformer-type voltage control apparatus, the dead-zone determination unit 26 determines the upper dead zone and the lower dead zone for a local voltage control device that controls a reactive-power-modified voltage control apparatus on the basis of the minimum value of the voltage upper and lower limit allowances within a region responsible for voltage control of the corresponding local voltage control device 15. However, the operation reference (control target value) for a reactive-power-modified voltage control apparatus changes gradually over time. Therefore, in order to prevent the occurrence of voltage violation even upon a change in control target value, it is desirable that the upper dead zone and the lower dead zone are set such that they are smaller than the minimum value of the voltage upper and lower limit allowances within the above region responsible for voltage control (for example, 50% of the minimum value of the voltage upper and lower limit allowances within the region responsible for voltage control). The upper dead zone and the lower dead zone may be set at a fixed value such as 1.5 to 1% of the voltage in a high-voltage system (normally, 6600 V) without using the determination method as described above.

Figure 8:
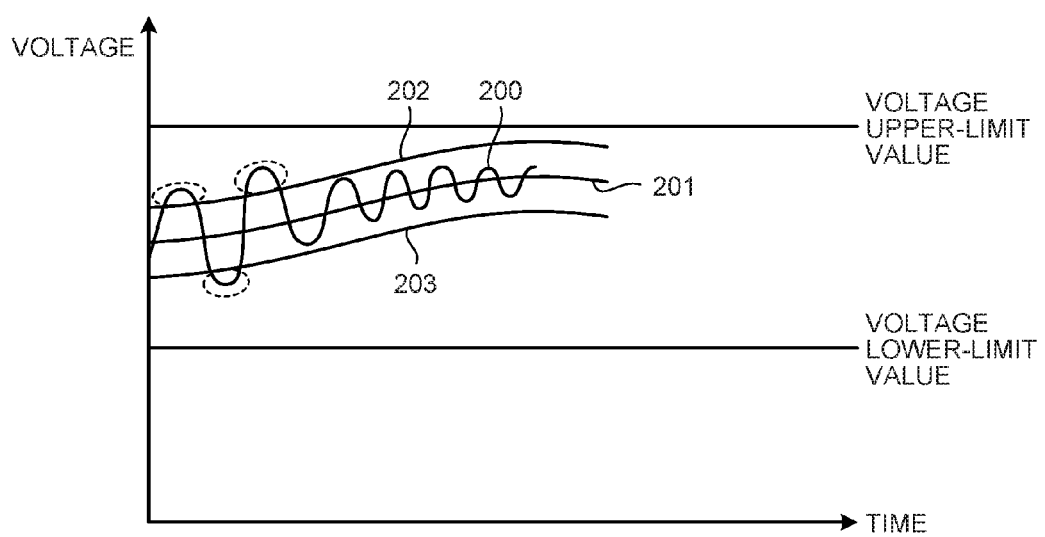
FIG. 8 is a diagram illustrating an example of voltage control in a reactive-power-modified voltage control apparatus.

FIG. 8 is a diagram illustrating an example of voltage control in a reactive-power-modified voltage control apparatus. A voltage change 200 shows the voltage change in a reactive-power-modified voltage control apparatus when the voltage is not controlled. A control target value 201 in FIG. 8 is a control target value that is generated by a local voltage control device that controls a reactive-power-modified voltage control apparatus on the basis of the voltage of the reactive-power-modified voltage control apparatus. As this control target value, for example, a mean value of the voltage 200 of a reactive-power-modified voltage control apparatus for a given period can be used. An upper-limit value 202 is a value obtained by adding the upper dead zone indicated by the centralized voltage control device 8 to the control target value 201. A lower-limit value 203 is a value obtained by subtracting the lower dead zone indicated by the centralized voltage control device 8 from the control target value 201. A local voltage control device that controls a reactive-power-modified voltage control apparatus controls the voltage of the reactive-power-modified voltage control apparatus such that it falls within the control range between the upper-limit value 202 and the lower-limit value 203. This suppresses a voltage change that deviates from this control range (voltage changes as illustrated by dotted circles in the example in FIG. 8).

In the present embodiment, the load/power-generation amount is estimated and the voltage upper and lower limit values are indicated to a local voltage control device, for example, hourly. However, this is not a limitation, and the load/power-generation amount can be estimated and the voltage upper and lower limit values can be indicated, for example, every several tens of minutes (e.g., 30 minutes) to several hours or at a time interval equal to or longer than several hours. Further, it is possible to transmit a command regarding the voltage upper and lower limit values, the upper dead zone, and the lower dead zone to a local voltage control device only when the voltage upper and lower limit values, the upper dead zone, and the lower dead zone greatly change. This further reduces the communication load.

In preparation for the case where there is a local voltage control device that cannot receive voltage upper and lower limit value commands every centralized-control cycle from the centralized voltage control device due to a communication fault or other problems, it is also possible to transmit in advance the voltage upper and lower limit values, the upper dead zone, and the lower dead zone for multiple time slots (for example, for the next one day) from the centralized voltage control device to a local voltage control device and to store them in the local voltage control device. In this case, when a communication abnormality in a certain local voltage control device occurs, the local voltage control device can operate on the basis of these stored voltage upper and lower limit values and also the centralized voltage control device can estimate the operations of the local voltage control device. In this case, the processing at Step S11 in FIG. 3 for correcting the estimated value of the load/power-generation amount is omitted.

For example, in the case where, during a night with no photovoltaic power generation, a voltage change attributable to factors in the power distribution system is small, an allowance is created for the voltage compensation capability of a reactive-power-modified voltage control apparatus. This allowance can be used to suppress a voltage change with a long cycle. Similarly to a transformer-type voltage control apparatus, the amount of control can be indicated by the centralized voltage control device 8 to a local voltage control device that controls a reactive-power-modified voltage control apparatus.

FIG. 9 is a diagram illustrating an example in which an allowance for the voltage compensation capability of a reactive-power-modified voltage control apparatus is created. The voltage changes 108 and 109 illustrated by dotted lines in FIG. 9 are identical to the voltage changes 108 and 109 illustrated in FIG. 5. The voltage changes 108 and 109 show the maximum compensation for the voltage rise or the voltage drop by the reactive-power-modified voltage control apparatus 6. An intra-system voltage change 110 shows the maximum value of the voltage change on the rising side attributable to factors in the system, excluding a voltage change in a higher-order system. An intra-system voltage change 111 shows the maximum value of the voltage change on the dropping side attributable to factors in the system, excluding a voltage change in a higher-order system. That is, the intra-system voltage change 110 is obtained by subtracting the maximum voltage change (rising side) 102 in a higher-order system from a voltage change 104 in FIG. 5. Also, the intra-system voltage change 111 is obtained by subtracting the maximum voltage change (dropping side) 103 in a higher-order system from a voltage change 105 in FIG. 5. As illustrated in FIG. 9, when the intra-system voltage changes 110 and 111 are smaller than the maximum value of the voltage compensation capability of a reactive-power-modified voltage control apparatus, an allowance for the voltage compensation capability is created. In such a case, at Step S13 in FIG. 3, instead of setting "reactive-power output=0", the condition is set that the reactive power falls within the range of a reactive-power allowance in order to acquire the amount of control (reactive power) to be indicated to a reactive-power-modified voltage control apparatus. The centralized voltage control device 8 also indicates a dead zone in the same manner as the above example. A local voltage control device that controls a reactive-power-modified voltage control apparatus adds a voltage corresponding to the reactive power indicated by the centralized voltage control device 8 to a control target value set by the device itself and controls the voltage such that it falls within a control range provided with the upper dead zone and the lower dead zone with respect to this added value.

An allowance for the voltage compensation capability of a reactive-power-modified voltage control apparatus is, for example, acquired as described below. A load and power-generation-amount distribution is acquired as a "minimum-load and maximum-power-generation distribution with reactive-power output of reactive-power-modified voltage control apparatus=0" in order to acquire the maximum voltage change on the rising side in the system (the intra-system voltage change 110 in FIG. 9). Also, a load and power-generation-amount distribution is acquired as a "maximum-load and minimum-power-generation distribution with reactive-power output of reactive-power-modified voltage control apparatus=0" in order to acquire the maximum voltage change on the dropping side in the system (the intra-system voltage change 111 in FIG. 9). An allowance for the upper voltage compensation capability can then be acquired from the difference between the maximum voltage compensation capability (Qmax) of a reactive-power-modified voltage control apparatus and the reactive-power amount that corresponds to the maximum voltage change on the rising side in the system. Similarly, an allowance for the lower voltage compensation capability can be acquired from the difference between the maximum voltage compensation capability (Qmax) of a reactive-power-modified voltage control apparatus and the reactive-power amount that corresponds to the maximum voltage change on the dropping side in the system. When this allowance is equal to or less than zero, an allowance for the voltage compensation capability of a reactive-power-modified voltage control apparatus is not used for suppressing long-cycle fluctuations. When an allowance for the voltage compensation capability of a reactive-power-modified voltage control apparatus is used to suppress long-cycle fluctuations, the following equation (3) is used to calculate the optimal voltage distribution, instead of the evaluation function expressed above as the equation (2). W4 represents weight.

Evaluation function value=sum of amounts of violation from voltage upper and lower limits at each point of power distribution system×$W_p$+maximum value of amount of decrease in voltage allowance on upper-limit side at each point within region responsible for voltage control of each transformer×$W_1$+maximum value of amount of decrease in voltage allowance on lower-limit side at each point within region responsible for voltage control of each transformer×$W_1$+amount of change in transformer target voltage from previous command×$W_2$+power transmission loss×$W_3$+reactive-power command absolute value×$W_4$    (3)

The centralized voltage control device 8 may perform the processing as described above (processing of calculating an allowance for the voltage compensation capability and using this allowance for suppressing long-cycle voltage fluctuations) in a preset time slot in which the allowance is expected to be created in a reactive-power-modified voltage control apparatus (such as during the night). Alternatively, the centralized voltage control device 8 may perform the processing of always calculating an allowance for the voltage compensation capability and using the allowance when created, for suppressing long-cycle voltage fluctuations.

As described above, the allowance in a reactive-power-modified voltage control apparatus is used to remove long-cycle fluctuations on the basis of the reactive power indicated by the centralized voltage control device 8. In this case, voltage violation can be suppressed, for example, when the Ferranti effect (a voltage rise due to a reactive-power output from general end-users' power-factor-improvement capacitors) during the night cannot be compensated for only by a transformer-type voltage control apparatus.

As described above, in the present embodiment, the voltage-fluctuation-band estimation unit 22 estimates the voltage fluctuation band of short-cycle voltage fluctuations in the system after a reactive-power-modified voltage control apparatus removes short-cycle voltage fluctuations, and sets a threshold value for a voltage allowance for an appropriate voltage range on the basis of the voltage fluctuation band to acquire the optimal voltage distribution. With this operation, without increasing the communication load, the voltage can be maintained within an appropriate range by following voltage fluctuations in the power distribution system, and the number of times the taps of a transformer-type voltage control apparatus are changed can be reduced while reducing the cost.

INDUSTRIAL APPLICABILITY

As described above, the voltage monitoring control device and the voltage monitoring control method according to the present invention are useful for a system that controls a voltage in a power distribution system.

REFERENCE SIGNS LIST

1, 5, 6 voltage control apparatus, 2 bus-bar, 3-1, 3-2 breaker, 4-1, 4-2 power distribution line, 7 communication network, 8 centralized voltage control device, 10 voltage and power-flow measurement device, 11, 15, 16 local voltage control device, 20 control unit, 21 load and power-generation-amount estimation unit, 22 voltage-fluctuation-band estimation unit, 23 load and power-generation-amount estimated-value correction unit, 24 optimal-voltage-distribution determination unit, 25 voltage upper-and-lower-limit-value determination unit, 26 dead-zone determination unit, 27 transceiver unit, 28 storage unit.

The invention claimed is:

1. A voltage monitoring control device that is connected, via a communication network, to a first local voltage control device, which is connected to a transformer-type voltage control apparatus that is connected to a power distribution line in a high-voltage system and controls a voltage on the power distribution line and which adjusts an amount of control of the voltage control apparatus every second cycle, which is shorter than a first cycle, such that a voltage value controlled by the voltage control apparatus is maintained within a range between a voltage upper-limit value and a voltage lower-limit value that are updated every first cycle, and a second local voltage control device, which is connected to a reactive-power-modified voltage control apparatus that controls a voltage on the power distribution line and which adjusts an amount of control of the voltage control apparatus every third cycle, which is shorter than the first cycle, the voltage monitoring control device comprising:

a load and power-generation-amount estimation unit to estimate, every first cycle, a load and power-generation-amount distribution representing a difference between a pure load and a power-generation amount at each point of a power distribution system under each of a condition of a mean load amount and a mean power-generation amount, a condition of a minimum load amount and a maximum power-generation amount, and a condition of a maximum load amount and a minimum power-generation amount;

a voltage-fluctuation-band estimation unit to estimate a voltage fluctuation band of the voltage within the first cycle on a basis of the load and power-generation-amount distribution;

a control-target-voltage determination unit to determine a first threshold value for an allowance for an upper limit of an appropriate voltage range and a second threshold value for an allowance for a lower limit of an appropriate voltage range on a basis of the voltage fluctuation band estimated by the voltage-fluctuation-band estimation unit, and to determine a control target value to be indicated to the first local voltage control device on a basis of a difference between the first threshold value and the allowance for the upper limit and on a basis of a difference between the second threshold value and the allowance for the lower limit;

a voltage upper-and-lower-limit-value determination unit to determine the voltage upper-limit value and the voltage lower-limit value on a basis of the control target value; and a transceiver unit to transmit the voltage upper-limit value and the voltage lower-limit value to the first local voltage control device via the communication network.

2. The voltage monitoring control device according to claim 1, further comprising a dead-zone determination unit to determine a dead zone that indicates a width of a control range of a voltage of the reactive-power-modified voltage control apparatus, wherein the transceiver unit transmits, via the communication network, the dead zone to the second local voltage control device, which controls the reactive-power-modified voltage control apparatus.

3. The voltage monitoring control device according to claim 1, wherein the voltage-fluctuation-band estimation unit estimates an upper voltage fluctuation band, which is the voltage fluctuation band on a voltage rising side, on a basis of a difference between the load and power-generation amount under a condition of a minimum load amount and a maximum power-generation amount and the load and power-generation amount under a condition of a mean load amount and a mean power-generation amount, and estimates a lower voltage fluctuation band, which is the voltage fluctuation band on a voltage dropping side, on a basis of a difference between the load and power-generation amount under a condition of a mean load amount and a mean power-generation amount and the load and power-generation amount under a condition of a maximum load amount and a minimum power-generation amount.

4. The voltage monitoring control device according to claim 3, wherein the voltage-fluctuation-band estimation unit calculates, as the upper voltage fluctuation band, a value obtained by adding a preset maximum voltage change on a voltage rising side in a higher-order system to a difference between the load and power-generation amount under a condition of a minimum load amount and a maximum power-generation amount and the load and power-generation amount under a condition of a mean load amount and a mean power-generation amount, and calculates, as the lower voltage fluctuation band, a value obtained by adding a preset maximum voltage change on a voltage dropping side in a higher-order system to a difference between the load and power-generation amount under a condition of a mean load amount and a mean power-generation amount and the load and power-generation amount under a condition of a maximum load amount and a minimum power-generation amount.

5. The voltage monitoring control device according to claim 3, wherein the voltage-fluctuation-band estimation unit determines a maximum power-generation amount, a mean power-generation amount, and a minimum power-generation amount on a basis of a weather forecast with the first cycle.

6. The voltage monitoring control device according to claim 3, wherein the voltage-fluctuation-band estimation unit performs power-flow calculation on a basis of a measurement result of a voltage and a power flow at each point in a system to acquire and record an actual load amount, and determines a maximum load amount, a mean load amount, and a minimum load amount on a basis of a preceding actual load amount.

7. The voltage monitoring control device according to claim 1, wherein the load and power-generation-amount estimation unit estimates the load and power-generation-amount distribution by setting an output of reactive power from the reactive-power-modified voltage control apparatus to zero.

8. The voltage monitoring control device according to claim 1, wherein the load and power-generation-amount estimation unit calculates an allowable amount on a voltage rising side and a voltage dropping side in the reactive-power-modified voltage control apparatus on a basis of a difference between a maximum compensation voltage that corresponds to a maximum reactive power capable of being output from the reactive-power-modified voltage control apparatus and a voltage based on the load and power-generation amount under a condition of a minimum load amount and a maximum power-generation amount, the control-target-voltage determination unit determines reactive power as a control target value to be indicated to the second local voltage control device such that an amount of control of reactive power of the reactive-power-modified voltage control apparatus becomes equal to or less than the allowable amount, and the transceiver unit transmits the reactive power to the second local voltage control device via the communication network.

9. A voltage monitoring control method in a voltage monitoring control device that is connected, via a communication network, to a first local voltage control device, which is connected to a transformer-type voltage control apparatus that is connected to a power distribution line in a high-voltage system and controls a voltage on the power distribution line and which adjusts an amount of control of the voltage control apparatus every second cycle, which is shorter than a first cycle, such that a voltage value controlled by the voltage control apparatus is maintained within a range between a voltage upper-limit value and a voltage lower-limit value that are updated every first cycle, and a second local voltage control device, which is connected to a reactive-power-modified voltage control apparatus that controls a voltage on the power distribution line and which adjusts an amount of control of the voltage control apparatus every third cycle, which is shorter than the first cycle, the voltage monitoring control method comprising:

estimating, every first cycle, a load and power-generation-amount distribution representing a difference between a pure load and a power-generation amount at each point of a power distribution system under each of a condition of a mean load amount and a mean power-generation amount, a condition of a minimum load amount and a maximum power-generation amount, and a condition of a maximum load amount and a minimum power-generation amount;

estimating a voltage fluctuation band of the voltage within the first cycle on a basis of the load and power-generation-amount distribution;

determining a first threshold value for an allowance for an upper limit of an appropriate voltage range and a second threshold value for an allowance for a lower limit of an appropriate voltage range on a basis of the estimated voltage fluctuation band and determining a control target value to be indicated to the first local voltage control device on a basis of a difference between the first threshold value and the allowance for the upper limit and on a basis of a difference between the second threshold value and the allowance for the lower limit;

determining the voltage upper-limit value and the voltage lower-limit value on a basis of the control target value; and transmitting the voltage upper-limit value and the voltage lower-limit value to the first local voltage control device via the communication network.

* * * * *